Nov. 21, 1967  R. W. LARSON ET AL  3,353,575
METHOD OF DELIMBING AND FELLING TREES
Original Filed June 3, 1963
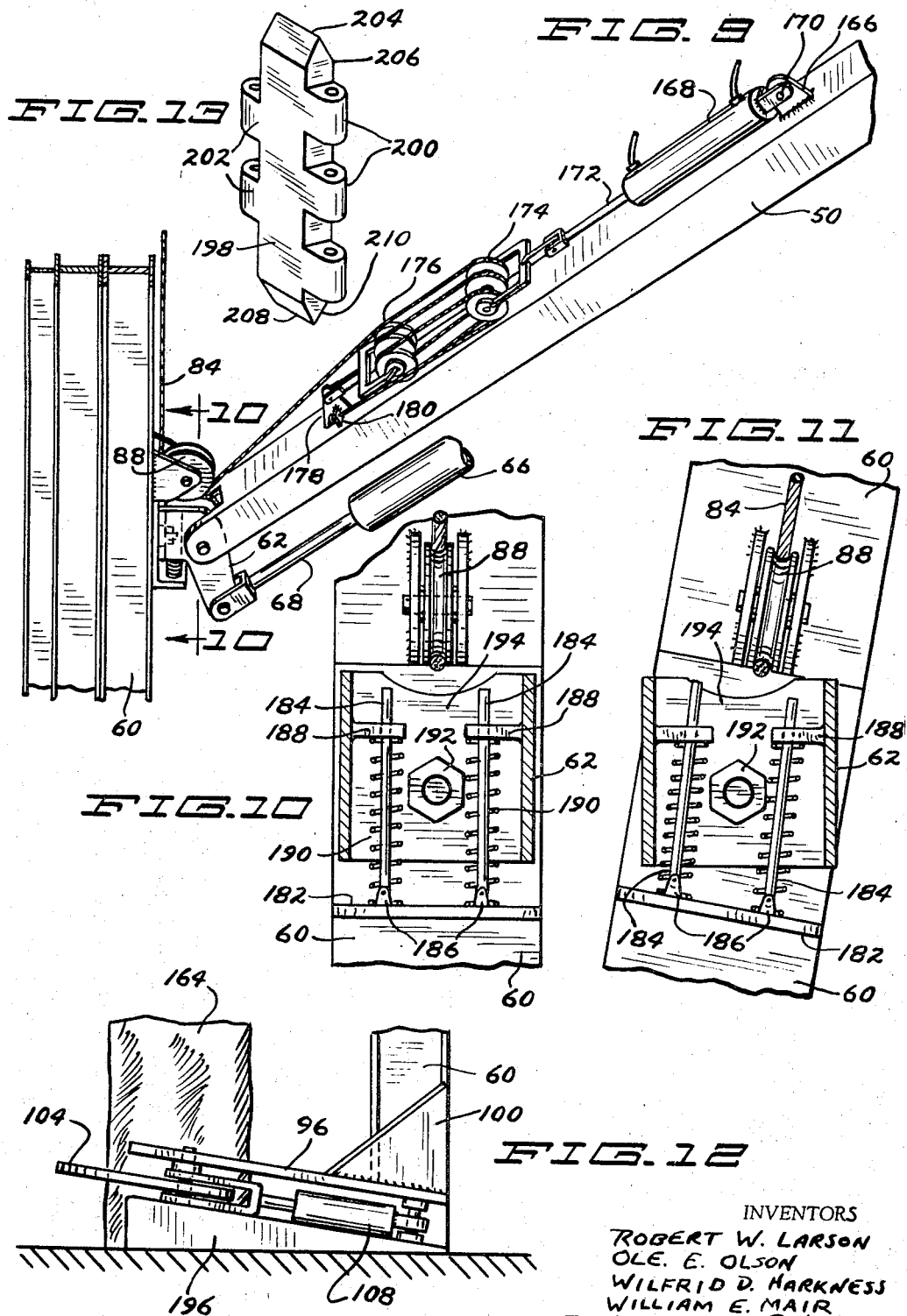
INVENTORS
ROBERT W. LARSON
OLE E. OLSON
WILFRID D. HARKNESS
WILLIAM E. MAIR
By Meyers & Peterson
ATTORNEYS

United States Patent Office 3,353,575
Patented Nov. 21, 1967

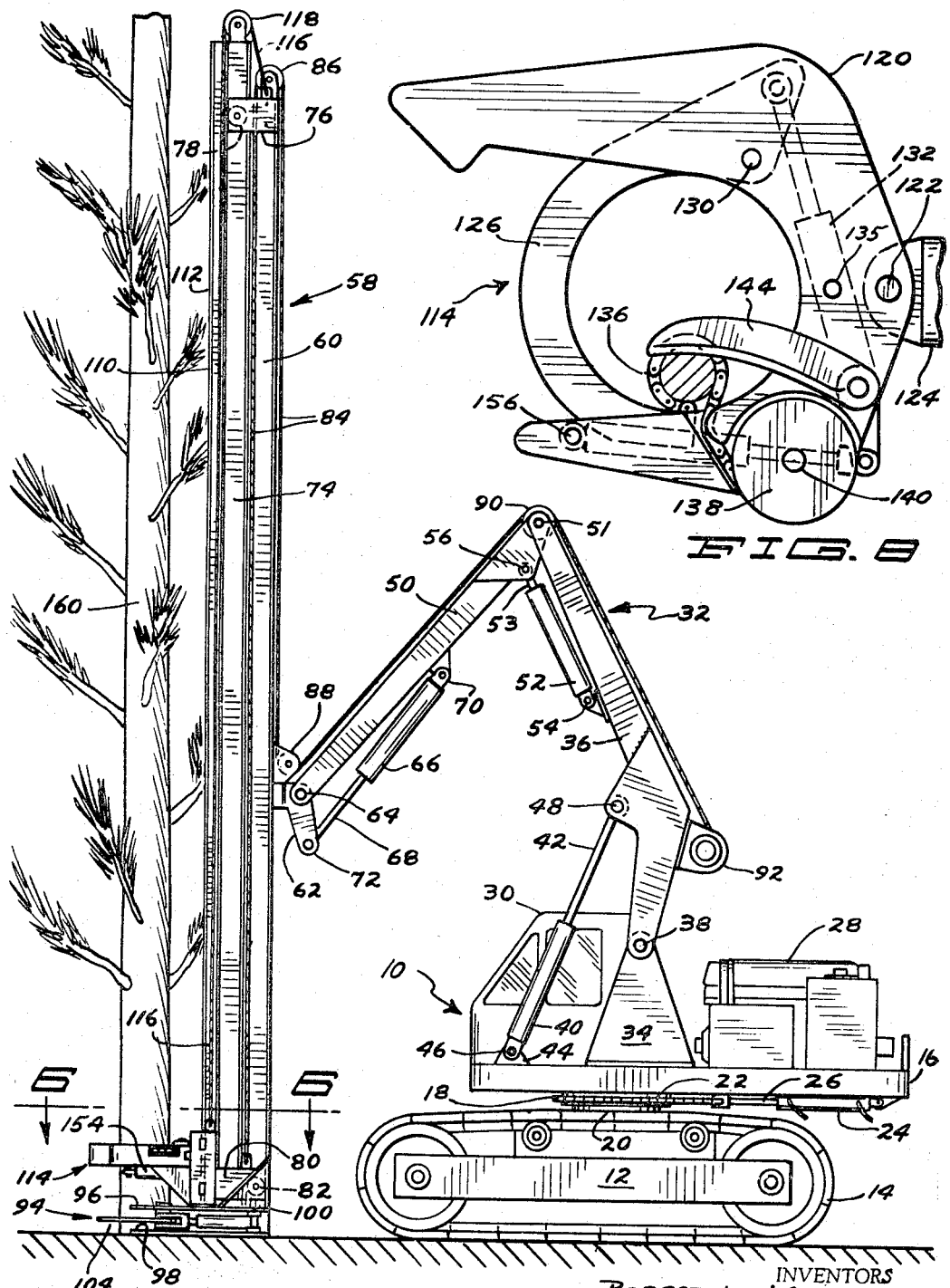

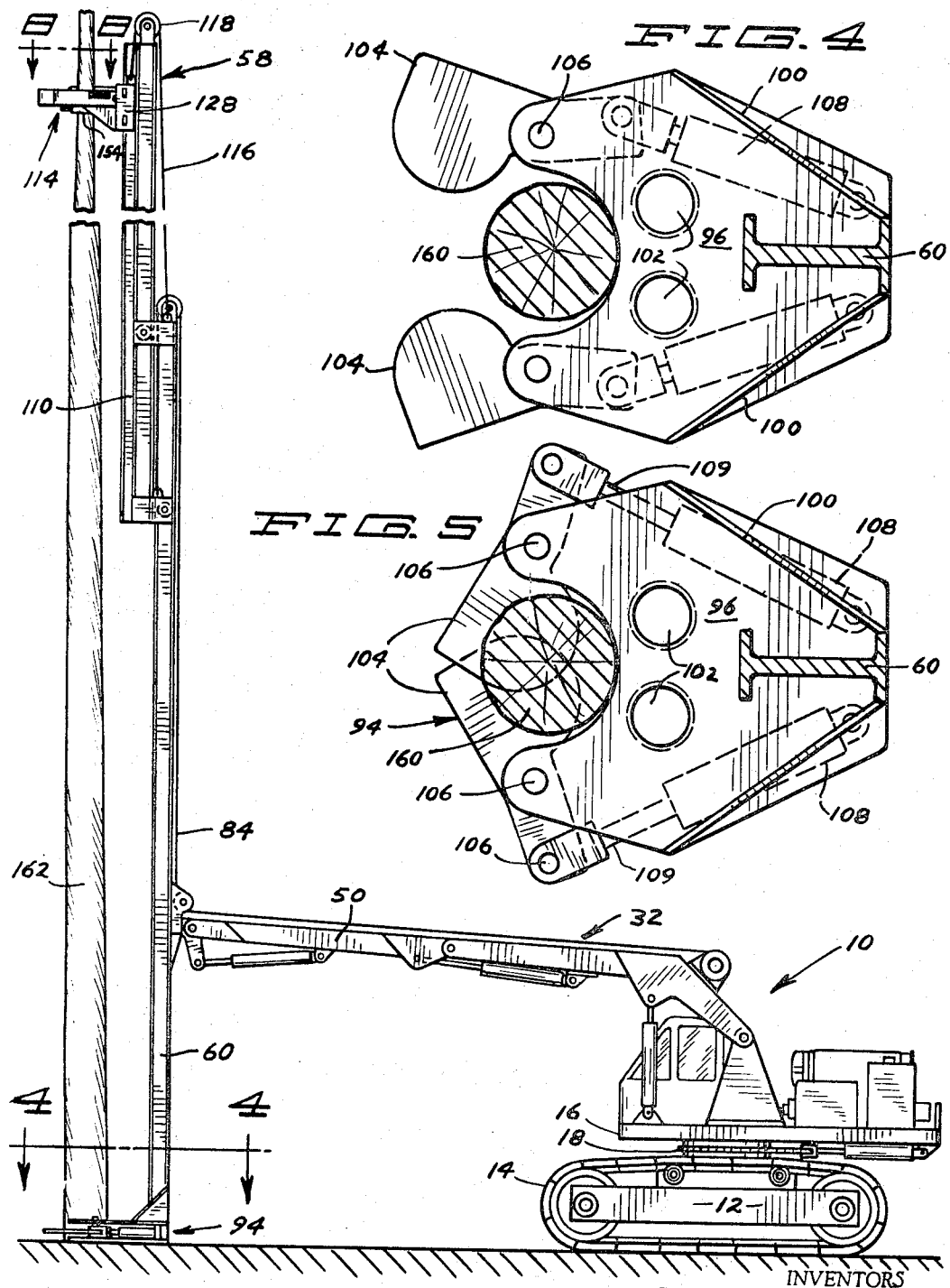

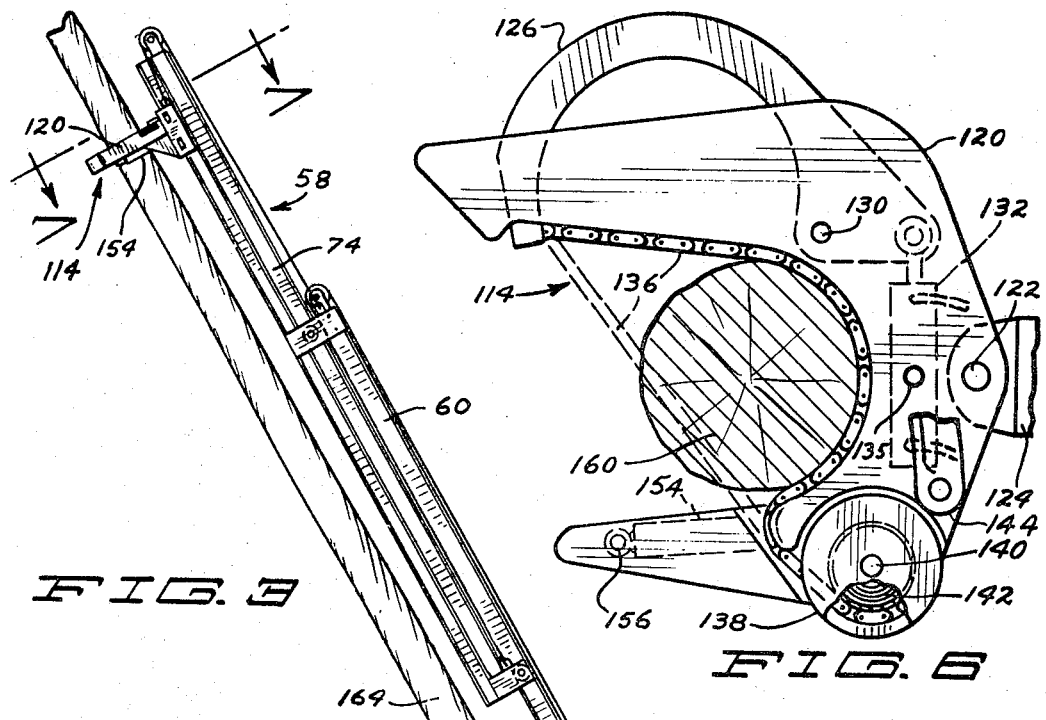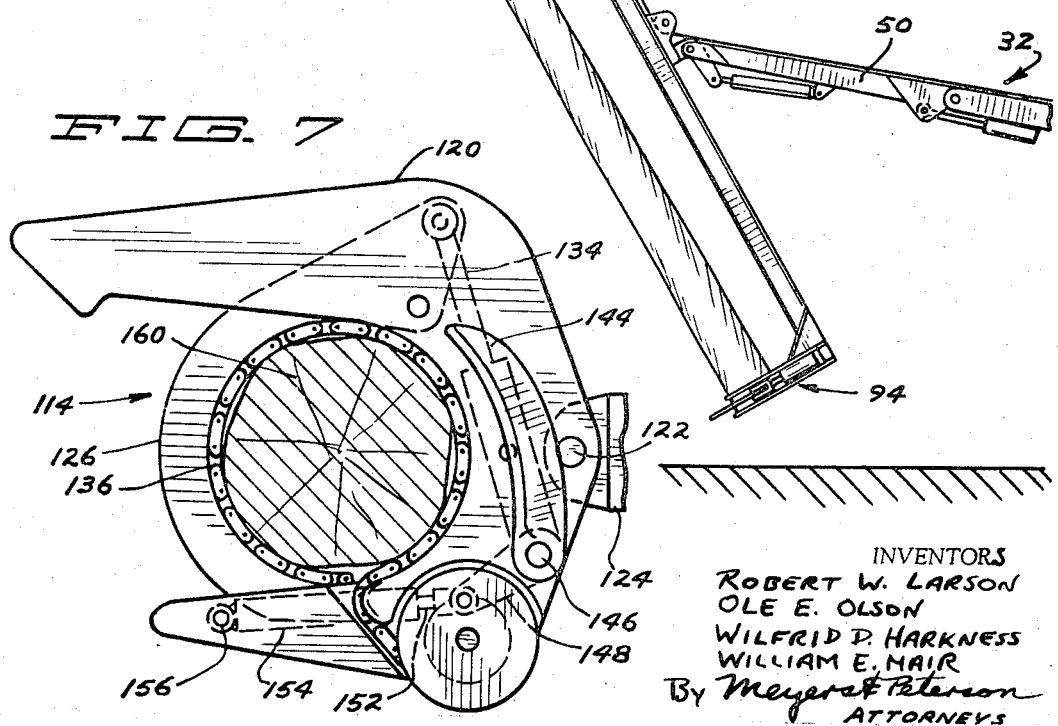

3,353,575
METHOD OF DELIMBING AND FELLING TREES
Robert W. Larson, Rte. 2, Lake Park Road, Ashland, Wis. 54806; Ole E. Olson, Caramat, Ontario, Canada; and Wilfrid D. Harkness, Steedman Drive, and William E. Mair, Manitoba St., both of Marathon, Ontario, Canada
Original application June 3, 1963, Ser. No. 285,114, now Patent No. 3,252,487, dated May 24, 1966. Divided and this application Oct. 19, 1965, Ser. No. 498,001
15 Claims. (Cl. 144—309)

ABSTRACT OF THE DISCLOSURE

A standing tree is delimbed by impact shearing, the impact shearing involving driving a relatively massive shearing element axially along the periphery of the tree at a rapid and continuous rate. The same element is driven in an opposite direction in close proximity to remove any remaining branch stubs by impact shearing that were not removed during the first step. The tree is also topped after the delimbing step has been carried out and it is also severed at the bottom while preventing it from falling. The final step involves laying the thus prepared log onto a stack of logs on the ground.

---

This application is a division of our application for Apparatus for Delimbing and Felling Trees, Ser. No. 285,114, filed June 3, 1963, now Patent No. 3,252,487.

The present invention relates generally to a process of harvesting timber, and pertains more particularly to a method of delimbing and felling trees.

An object of the invention is to provide a method for harvesting standing trees that can produce, at the site of the standing tree, a completely delimbed and prepared log in rapid and efficient manner.

Another object of the invention is to provide a method of stripping the limbs from trees to a selected height while the tree is still standing.

Another object is to permit the topping of the standing tree at the desired height.

The invention also has for an object the shearing of the tree at its bottom after the topping action has occurred.

Yet another object of the invention is to provide a method of harvesting trees which so prepares the tree that it can be immediately placed upon a pile of logs lying on the ground. More specifically, this object of the invention is to provide a method of harvesting timber which can in rapid and efficient manner delimb, top, sever and stack the finished log for subsequent transportation out of the forest.

Briefly described, the method according to the invention includes the step of delimbing a standing tree by means of impact shearing, which step is effectively carried out by driving a relatively massive shearing element along the periphery of the trunk of the tree at a rapid, continuous rate. The method further includes the steps of topping the tree after the delimbing step has been carried out, then severing the tree at the bottom while preventing it from falling, and finally laying the prepared log onto a stack of logs on the ground.

Other objects and advantages of the invention will more fully appear from the following description of a suitable apparatus for carrying out the method, made in connection with the accompanying drawings, wherein like reference characters refer to the same or similar parts throughout the several views and in which:

FIGURE 1 is a side elevational view of one form which a suitable apparatus may assume, the view showing the apparatus being moved into juxtaposition with a standing tree that is to be delimbed and cut;

FIGURE 2 is a side elevational view with the apparatus spaced farther from the tree than in FIGURE 1, but the apparatus being depicted in a position at the termination of the delimbing action and just prior to a topping operation;

FIGURE 3 is a fragmentary side elevation of the vertical boom assembly while handling the now completely cut tree for the purpose of placing the severed tree on the ground;

FIGURE 4 is a plan view of the bottom shear mechanism before a shearing operation is undertaken;

FIGURE 5 is a view similar to FIGURE 4 but showing a shearing operation in process;

FIGURE 6 is a plan view of the combination delimbing and top shear mechanism, the view being taken in the direction of line 6—6 of FIGURE 1;

FIGURE 7 is a view similar to FIGURE 6 with the mechanism ready for a delimbing operation;

FIGURE 8 is another view of the combined delimbing and shearing mechanism, this view being taken in the direction of line 8—8 of FIGURE 2 and illustrating the shearing member in a position just starting to perform a topping operation;

FIGURE 9 shows an alternate form of mechanism for effecting swift and exaggerated pulling of the flexible cable through means of a multiple sheave drive means;

FIGURE 10 is an enlarged vertical cross section of the bell crank mount of the vertical boom taken on the line 10—10 of FIGURE 9 and looking in the direction of the arrows;

FIGURE 11 is a view similar to FIGURE 10 showing the vertical boom resiliently displaced from its normal position;

FIGURE 12 shows an alternate form of the bottom shear mechanism for securing a positive seat for the base of a cut tree, and FIGURE 13 is an alternate form of chain link for the shearing knife head.

Referring now in detail to the drawings, FIGURES 1 and 2 show a vehicle denoted generally by the reference numeral 10. While this vehicle can assume a variety of mechanical constructions, it is illustrated as having a chassis 12 equipped with endless tracks 14. Surmounting the chassis 12 is a swing platform 16 which is rotatable about a vertical axis by reason of a chain 18 in mesh with a main sprocket 22 affixed to a base plate 20 on the chassis 12. Thus, by means of the chain 18 in mesh with the sprocket and a pair of hydraulic cylinders 24 with extensible pistons 26, the platform 16 can be actuated into various angular positions. An engine 28 is carried on the platform and provides the propelling power for the vehicle as well as hydraulic power for the cylinders 24 and various hydraulic cylinders yet to be described. An operator's cab 30 is also located on the platform 16.

Indicated generally by the reference numeral 32 is an articulated or reach boom assembly. The boom assembly 32 is mounted on the swing platform 16 through the medium of a pair of uprights or standards 34 through the agency of a pivot pin or shaft 38. The rear boom section 36 can be raised and lowered by a hydraulic cylinder 40 having an extensible piston rod 42. The closed end of the cylinder 40 is connected to an anchor ear 44 fixedly secured to the platform 16, whereas the piston rod 42 is connected to the rear boom section 36 by a pin 48.

Continuing with the description of the articulated or reach boom assembly 32, it is to be observed that this assembly additionally includes a second arm or end boom 50 pivotally connected to the boom section 36 by a pin 51. A hydraulic cylinder 52 having an extensible piston rod 53 has its closed end pivotally connected to the rear boom section 36 by a pin 54. The piston rod 53, on the other hand, is pivotally connected to the end boom 50 by a pin 56.

Carried at the end of the boom 50 of the articulated or reach boom assembly 32 is a sliding boom assembly 58 comprised of a mast or vertical boom 60 having an I-beam configuration. A bell crank 62 has one end fixedly secured to the vertical boom 60 and is pivotally attached to the end boom 50 through the medium of a pin 64. For pivoting the boom 60 in a vertical plane determined by the angular position of the swing platform 16 is a hydraulic cylinder 66 having a reciprocable piston 68. The closed end of the cylinder 66 is connected to an intermediate portion of the end boom 50 by way of a pin 70 and the piston is connected in a pivotal manner to the bell crank 62 via a pin 72.

Included as part of the boom assembly 58 is a traveling vertical boom 74 which also has an I-shaped cross section. At the upper end of the boom 60 is a bracket 76, the bracket being fixedly attached to the boom 60 and provided with guide wheels 78 which bear against the flange of the boom 74 lying adjacent the boom 60. A lower bracket 80 is affixed to the traveling boom 74 and it is similarly provided with guide wheels 82. It will be appreciated that the traveling boom 74 is constrained to follow a reciprocal path relative to the boom 60 owing to the action provided by the guide wheels 78 and 82, the guide wheels 82 engaging the flange of the boom 60 adjacent the boom 74. In order to raise and lower the boom 74 relative to the boom 60, a flexible cable 84 is connected at one end to the lower end of the traveling boom 74 and then extends upwardly between this boom and the boom 60. The cable 84 then passes about a sheave or pulley 86 mounted at the top of the boom 60 and thence downwardly beneath a sheave 88 mounted for rotation about a fixed axis provided by the boom 60. After passing beneath the sheave 88, the cable 84 extends along the end boom 50 of the boom assembly 32 and then passes over a sheave 90 at the pin 51. A drive means such as a hydraulic winch 92 on the rear boom section 36 serves as a means for taking up and paying out the cable 84 in order to elevate and lower, respectively, the traveling boom 74 with respect to the boom 60.

Describing now the bottom shear mechanism which is designated generally by the reference numeral 94, it can be seen from FIGURES 1–3 that this mechanism includes an upper plate 96 and a lower plate 98. The upper plate 96 is made integral with the boom 60 of the sliding boom assembly 58 through the agency of gusset members 100. The two plates 96, 98 are made rigid with respect to each other by vertical connecting pins or studs 102, the upper ends of these studs being welded to the plate 96 and the lower ends to the plate 98. Between the plates 96, 98 are a pair of shear blades 104 that are pivotally mounted on a pair of pins 106. These blades are actuated toward each other in the performance of their cutting operation by two hydraulic cylinders 108, each being equipped with a extensible piston rod 109.

Welded or otherwise secured to the traveling boom 74 is a T-shaped guide rail providing a flange 112. The guide rail 110 functions as a track means for the combined unit consisting of a delimbing means and a top shear mechanism identified in its entirety by the reference numeral 114. For the purpose of causing the unit 114 to move upwardly in the performance of the stripping or delimbing operation, there is a cable 116 which is connected at one end to the unit 114 and passes over a sheave or pulley 118 carried at the top of the boom 74; the other end of the cable 116 may be attached to the bracket 76 which has already been referred to as being affixed to the boom 60. The delimbing and top shear unit 114 includes a U-shaped frame structure 120 which may be of a built-up welded plate construction. The U-shaped configuration of the frame 120 is shown to better advantage in FIGURES 6 and 7. As can also readily be seen from these figures, there is a pin 122 which pivotally mounts the frame 120 to a bracket 124 having a base 128 (best understood from FIGURE 2), the base 128 carrying rollers (not visible) which engage the flange 112 of the guide rail 110.

For the purpose of effecting the delimbing action, an encircling arm 126 is pivotally connected to a locus within the frame structure 120 by a pivot pin 130. The arm 126 is actuated by a hydraulic cylinder 132 provided with an extensible rod 134. The cylinder 132 is pivotally supported by the frame 120 by pin means 135. When the piston rod 134 is retracted into the cylinder 132, the arm 126 assumes the position pictured in FIGURE 6, but when the rod 134 is urged outwardly, then the arm assumes the position shown in FIGURE 7.

The actual element that accomplishes the stripping of the limbs from the tree as the unit 114 moves upwardly is a shearing knife head such as a sharp-edged flexible chain 136 having one end thereof secured to the free end of the arm 126. The other end of the chain 136 is attached to a spool or drum 138 mounted for rotation about a vertical pin or post 140. The spool 138 is biased in a rotative direction, more specifically, a counterclockwise direction, by a flat spiral spring 142, a portion of the upper end of the spool 138 having been broken away in FIGURE 6 to show this spring. Stated somewhat differently, the chain 136 is caused to be wound on the spool 138 when there is no tree that would overcome the spring action provided by the spring 142. Thus, when the encircling arm 126 is in the position pictured in FIGURE 6 and there is no tree within the opening of the U-shaped frame 120, then the chain 138 will appear in the phantom position shown in this particular figure.

Continuing with the description of the delimbing and top shear unit 114 and considering now in detail the elements performing the shearing function, it is to be observed that a blade 144 is free to move across the top of the U-shaped frame structure 120, the blade being attached to a shaft 146 that extends downwardly through the frame 120. At the lower end of the shaft 146 is a lever arm 148. The lever arm 148 is connected by means of a pin 150 to a piston rod 152 projecting from a hydraulic cylinder 154. The closed end of the cylinder 154 is pivotally attached to a fixed internal portion of the frame structure 120 by the pin 156 so that when the rod 152 is projected outwardly the blade 144 is caused to move in a counterclockwise direction as viewed in FIGURE 8.

Having presented the foregoing information, the manner in which our apparatus operates should be readily comprehended. Assuming that a standing tree 160 with limbs thereon is to be delimbed and severed, the vehicle 10 is moved into the position in which it appears in FIGURE 1. The articulated or reach boom assembly 32 is shown with the booms 36 and 50 forming an acute angle. However, this angle can be increased or decreased depending upon the particular circumstances. At any rate, the vehicle 10 is moved into the appropriate position so as to cause both the bottom shear mechanism 94 and the combined delimbing and top shear unit 114 to encircle the standing tree 160, all as is obvious from an inspection of FIGURE 1.

As the unit 114 moves into an encircling or embracing relationship with the tree 160, the chain 136 will be forcibly deflected from its phantom outline position of FIGURE 6 into the partially encircling relationship shown in solid outline in this particular figure. The spool 138, due to the yieldability of its flat spiral spring 142, will permit this to happen. However, when the cylinder 132 receives fluid under pressure, its piston rod 134 will be projected and such projection causes the arm 126 to encircle the tree 160 as appears in FIGURE 7. Since the chain 136 is connected at one end to the free end of the arm 126, the chain will be completely enwrapped about the tree 160, irrespective of its particular diameter because the spool 138 will take up any slack in the chain 136 that might otherwise exist.

The orientation of parts pictured in FIGURE 7 illustrates that the delimbing and top shear unit 114, which is now at the bottom of the sliding boom assembly 58, is in readiness for being pulled upwardly in the performance of the stripping or delimbing operation. This automatically transpires when the winch 92 takes up its cable 84. It will be recalled that one end of the cable 84 is connected directly to the lower end of the traveling boom 74.

As the traveling boom 74 is pulled upwardly by the winch 92, the sheave 118 at the top of this boom is, of course, moved upwardly too. It acts against the cable 116 which has one end attached to the unit 114 and the other end fixedly connected to the bracket 76. Hence, when the traveling boom 74 moves, the unit 114 is compelled to move upwardly also. The upward movement of the unit 114 is guided by the T-shaped rail 110. As will be observed in this structural relationship of the elements, since cable 116 is fixedly secured to bracket 76 on the vertical boom 60, the net result is that for each increment of upward movement by sheave 118, with traveling boom 74, a similar incremental movement is produced in the cable 116 over the sheave 118, with corresponding movement of the unit 114 up the traveling boom 74 with a resultant accumulated movement or multiplied speed of the unit 114 relative to the tree 160. As will be appreciated, the actual effective speed of the unit will be a multiple of the speed with which the operator employs to the winch 92 to take up its cable 84.

As the unit 114 moves upwardly, the close engagement of the chain 136 with the tree 160 strips all of the branches therefrom. The shearing knife head in accordance with the stated objectives herein moves quite swiftly and exerts an impact cleavage upon the tree branches. Even when the shearing knife head comprises a chain member 136 in which the edges are dull, a fairly thorough job of delimbing can be accomplished. The flat spiral spring 142, of course, permits the spool 138 to pay out or take in the chain 136 as need be. In this regard, it will be recognized that the tree 160 becomes progressively smaller as the movement continues toward the upper end or top thereof, but the spool 138, due to the spring 142, readily accommodates for this. To distinguish the standing tree 160, which is to be considered as having its limbs on it, from the delimbed tree, the delimbed tree has been denoted by the reference numeral 162 in FIGURE 2.

When the combined delimbing and top shear unit reaches the desired height, which height is determined largely by the usable length of the tree, then the operator causes the cylinder 154 to receive fluid under pressure to the extent that the shaft 146, together with its top shear blade 144, is rotated in a counterclockwise direction. FIGURE 8 has been presented to show the initiation of this top shearing operation.

After the topping operation has been completed, then the bottom shear mechanism 94 is actuated through the medium of its hydraulic cylinder 108. The blades 104 of this mechanism 94 are moved from the position in which they are shown in FIGURE 4 to a position beyond which they are shown in FIGURE 5. This severs or cuts the lower end of the delimbed tree 162 from its rooted stump.

It will now be appreciated that the severed tree is the length of the tree between the blades 104 of the bottom shear mechanism 94 and the blade 144 of the combined delimbing and top shear unit 114. It will also be recognized that the chain 136 still encircles the upper end of the severed tree. At this time, the operator permits the traveling boom 74 to be lowered sufficiently so as to bring the unit 114 downwardly approximately one-third the length of the severed tree. The severed or cut tree has been designated by the reference numeral 134 in FIGURE 3. With the blades 104 still together, the operator can cause the boom assembly 32 to assume practically any optimum angular position that he desires. For the purpose of discussion, it will be assumed that the boom sections 36 and 50 are approximately in a straight line relationship with each other. If this is so, then the actuation of the hydraulic cylinder 66 can readily move the now cut or severed tree 164 into the angular relationship depicted in FIGURE 3. This is an intermediate orientation of the tree 164 preparatory to placing the tree on a pile of logs or other desired location on the ground. The swing platform 16 of the vehicle 10 can be swung into the appropriate angular position for placing the tree 164 where it is wanted. When in the angular position shown in FIGURE 3, the return of the arm 126 to its position of FIGURE 6 will release the severed tree 164 so that it readily falls from the sliding boom assembly 58.

An alternative procedure can be effected following the cleavage of the branches through the quickly ascending shearing knife head and after the topping operation has been completed. In such procedure, the blade 144 is withdrawn immediately after its actuation to top the tree. Since the shearing knife head lies beneath the topping blade 144, the cut upper end of the tree still remains captive. The cable 84 is then caused to play out at a rate just as quick as during its pulling cycle or even so fast that the tension exerted by the shearing knife head is virtually removed from the cable. The shearing head chain 136 will resiliently encircle the trunk of the tree and expand during its rapid descent. The broken or cut stubs of the branches which were cleaved during the ascent of the shearing knife head are now given a second impact during the descent thereof. These stubs including the upwardly angulated remainders of branches are easily removed by this second high speed treatment and the shearing knife head may then be raised to an intermediate position following which the tree is severed by the bottom shear and the cut tree piled as before described.

Although the hydraulic lines leading to the various cylinders have not been pictured, it can be appreciated that fluid under pressure is delivered from a suitable pump that can be driven from the engine 28. Appropriate valving can determine the extension and retraction of the various piston rods belonging to the various hydraulic cylinders in order to achieve the various maneuvers that are necessary in carrying out a given processing of a standing tree. Thus, a standing tree can be first delimbed, secondly, topped, thirdly, severed at its bottom and fourthly, manipulated into a desired position for placement on a pile of other logs or the like.

With reference to FIGURE 9, an alternate form of drive means is shown for effecting speed multiplication in the upward and downward travel of the flexible cable 34. In the form shown in FIGURE 9, the power winch 92 of FIGURE 1 is eleminated and the drive means is mounted directly upon the end boom 50. An anchoring bracket 166 is secured to the end boom 50 as shown and a hydraulic cylinder 168 is mounted pivotally thereto at 170. An extensible piston rod 172 projects from the cylinder 168 and is secured to a multiple sheave block 174 as shown. A second multiple sheave block 176 lies in confronting relation with respect to the block 174 and is anchored to bracket 178 which in turn is fixed adjacent the outer end of the end boom 50. The flexible cable 84 extends to the multiple sheave block 174 and then is passed back and forth between the two multiple sheave blocks for several loops. The end of the flexible cable 84 is then anchored at 180 to the end boom 50.

It will be appreciated that a short travel of the piston rod 172 will greatly multiply the relative travel of the flexible cable 84. Such a drive mechanism can thus effect the swift rise and fall of the shearing knife head to augment the impact cleavage previously mentioned. It will be noted that constant pressure applied to the cylinder 168 will cause the flexible cable 84 to accelerate when pulling the delimbing and top shearing unit from a position of rest. The effect is further augmented by the mass of the traveling boom 74 which also travels upwardly but at half the rate of speed of the combined unit. The net effect is a constant accelerating force applied to the knife head and the tremendous momentum effects the impact cleavage of the branches without appreciably slowing the speed at which the unit rises. Similarly, when the unit is permitted to fall freely, the acceleration of gravity maintains its momentum for snapping and cleaving the butt ends of branches which may remain.

While the bottom shear mechanism 94 can rest upon the ground and be supported and stabilized thereby, the upper end of the boom assembly 58 is not so braced or supported. This can, however, be a desirable feature in that the mast or vertical boom can weave laterally to conform to curvature and irregularities in the trunk of a tree. In order not to transmit this strain to the boom assembly 32, we have shown a resilient swivel connection between the bell crank 62 and the mast or vertical boom 60 in FIGURES 10 and 11. A flange 182 is rigidly fixed to the rear of the mast 60 and upstanding rods 184 are swivelly mounted to the flange 182 at 186. The upper ends of the rods 184 extend through respective guide lugs 188 and compression springs 190 may be placed respectively upon the rods 184 and in abutting relation between the flange 182 and the lugs 188 as shown in FIGURE 10. A pivot bolt 192 passes through the back plate 194 of the bell crank 62 and is firmly anchored in the mast 60. The bell crank 62 can thus swivel about the axis of pivot 192 and permit limited relative swinging of the mast relative to the bell crank 62. FIGURE 11 shows an extreme movement of the mast 60 as may be caused by the delimbing of an irregular tree. The springs 190, however, will tend to bring the mast or vertical boom 60 back into the alignment shown in FIGURE 10 when lateral forces are removed from the mast.

While the views of FIGURE 4 and FIGURE 5 show the bracing effect of the plate 96 against the base of the tree 160, there may be a tendency for the tree to become unseated once the bottom shear has severed the trunk from the stump. In order to assist in preserving the bracing effect of the bottom shear, the entire bottom shear mechanism can be affixed to the mast or vertical boom 60 at a slight angle as shown. In the angulated arrangement, a wedged-shaped bottom plate 196 may be substituted for the flat bottom plate 98 shown in FIGURE 1. The remaining elements of the bottom shear mechanism, however, may remain the same. It will now be observed that the blades 104 will cut the tree 164 at an angle and the cut tree will remain resting upon the blades 104 after it is cut. At the same time, the slight angle will tend to advance the tree 164 against the plate 96 and maintain it in abutted relation therewith for subsequent handling. The firm support of the delimbed and cut tree constitutes a safety factor in the subsequent handling of the trees.

As previously mentioned, the shearing knife head can exert a force upon the branches of a tree ranging from pure impact to a combination of impact, cleavage and cutting. The chain portion of the delimbing and top shear unit 114 can therefore comprise links of varying structure. One form is shown in FIGURE 13 and comprises a link plate 198 having ears 200 in alternate position with ears 202. The link plates can thus be hinged consecutively together. At the upper portion of the link plate 198 is an upwardly directed knife edge 204. A beveled surface 206 assists the chain constructed from such link plates to glide over the surface of the tree trunk and avoid gouging the wood. It is also within the contemplation hereof to provide a similar bottom edge 208 which may also be provided with a beveled face 210 as shown.

Although it is not desired to limit the invention to any particular theory, it is believed that a unique cooperation is achieved among the unit 114, the elongated cable 116 and the various actuating and/or drive mechanism elements hereinbefore described (and particularly the speed multiplying elements of the drive mechanism). If a conventional slow speed, high power drive mechanism were used with the instant unit 114 and elongated cable 116 to move the unit slowly up the tree, the unit could develop only a nominal amount of kinetic energy between branches and it would have substantially no kinetic energy, at least momentarily, at the very instant at which the shearing edge came in contact with a new branch and the cable started to take up any slack and to undergo a maximum tensile stress for pulling the knife edge through the branch. Under conditions of no stress, the cable 116 has an unstretched (first) length; under solely the load of the weight of the knife head, it must have a (second) slightly greater length; and during slow movement of the knife head against a branch in an effort to drag it slowly through a branch, the cable 116 must be stretched to a maximum (third) length which invloves the application of maximum tensile stress to the cable, as the power means attempted to drag the knife head through the branch. Assuming that it would be possible to generate sufficient force to drag the unit through the branch in such an arrangement, the cable would thus go through a cycle of maximum tensile stress and elongation (as it pulls the knife through a branch) followed quickly by a minimum or no tensile stress when the unit 114 clears the branch and the "stored" energy in the cable is momentarily relaxed. Under such circumstances, of course, the kinetic energy which the drive means attempts to impart to the unit 114 also goes through a cycle of approximately zero at the time the unit 114 is initially brought into engagement with the branch and the cable is developing its maximum tensile stress. The kinetic energy of the unit 114 after it has cleared a branch would still be very nominal in using an ordinary slow drive, so that such nominal kinetic energy would have little or no significant effect upon cutting of the next branch encountered by the unit 114.

In the practice of the instant invention, however, the actuating or drive mechanism employed imparts and maintains kinetic energy substantially continuously during the movement of the unit 114 up the tree in the preferred operation of the device. The kinetic energy of the unit 114 thus assists materially in cutting successive branches as the unit is moved up the tree. The tensile stress on the cable 116 pulling the unit up the tree is thus comparatively constant rather than going through the extreme in the cycle involved with a slow speed power device. It will be appreciated that as the rapidly moving knife head shears a branch, the kinetic energy thereof carries out an important, substantial part of the shearing, via impact, but the cable 116 also assists in imparting continuous kinetic energy to the unit (so the cable 116 will doubtlessly undergo some increase in tension as the unit passes through a branch and at least a nominal reduction in tension as the unit passes between branches). Since, however, there is a definite frictional drag involved in pulling the unit up a tree (even between branches), and the distance between branches is often very nominal, the over-all changes in tension in the cable during the rapid movement of the unit up the tree are not substantial. The cable is substantially continuously under tension. The cable is thus believed to be substantially continuously in a slightly elongated condition (within the elastic limits of the metal and in view of the continuous tension stress thereon). It is believed, however, that the tensile stress and/or elongation of the cable during the continuous movement of the unit 114 up the tree is continuously more than the tensile stress required merely to carry the weight of the unit (and its resistance to movement) but continuously less than the maximum tensile stress that would be imparted to this cable, if the unit were moved so slowly that its kinetic energy contributed substantially nothing to the cutting or shearing of the branches and the cable was required to impart all of the shearing force to the unit.

In the present operation, the drive mechanism maintains the unit 114 at a sufficient level of kinetic energy to drive it through the branches, primarily in an impact shearing or cleaving process, or at least such that the combination of the kinetic energy of the unit with the lifting forces continuously applied thereto by the cable provides the required over-all impact shearing force to shear the branches. The power means should preferably be capable of applying force substantially independent of the speed of operation so that as the resistance force changes, time is not required for the power means to in effect catch up, but is capable of continuously imparting energy.

It will, of course, be understood that various changes may be made in the form, details, arrangements and proportions of the parts without departing from the scope of our invention as set forth in the appended claims.

We claim:

1. A method of removing branches from a vertical tree that comprises driving a knife head upwardly for substantially the height of the tree and solely in an axial direction to shear the branches from the tree and imparting kinetic energy to the knife head substantially continuously during such upward travel thereof to effect impact shearing of the branches.

2. A method of removing branches from a vertical tree that comprises driving a knife head surrounding the tree upwardly for a substantial height of the tree and solely in an axial direction to shear the branches from the tree in a single pass and imparting kinetic energy to the knife head substantially continuously during such upward travel thereof to effect impact shearing of the branches.

3. A method of removing branches from a standing tree comprising the steps of disposing a shearing means in encircling relation to the trunk of said tree below the branches thereof and advancing said shearing means upwardly at a rapid rate and solely in an axial direction to remove said branches by impact shearing in a single pass.

4. A method as recited in claim 3 comprising the further step of dropping said shearing means downwardly with respect to said tree to remove any remaining stubs which may have been left after said first delimbing pass.

5. A method of removing branches from a standing tree trunk that comprises driving a knife head solely in an axial direction along and in close proximity to said tree to at least partially remove at least two of the branches on said trunk by impact cleaving thereof.

6. A method of removing branches from a standing tree trunk that comprises driving a knife head in one direction along and in close proximity to said tree to at least partially remove at least two of the branches on said trunk by impact cleaving thereof and then driving said knife head in the opposite direction and in close proximity with said tree trunk to remove any remaining branch stubs by impact cleavage thereof from said trunk.

7. In the process of harvesting timber, the improved delimbing step comprising advancing a delimbing head rapidly throughout the usable length of a standing tree and solely in an axial direction to strip the branches from said tree by impact shearing.

8. A method of removing branches from a standing tree trunk that comprises driving a knife head in one direction in close proximity with said tree trunk to at least partially remove all of the branches on said trunk by impact, and then driving said knife head in the other direction in close proximity with said tree trunk to remove any remaining branch stubs by impact from said trunk.

9. A method of removing branches from a standing tree trunk, comprising the steps of driving a trunk-encircling knife head in one direction throughout the usable length of said trunk to remove, at least partially, the branches on said trunk by impact shearing, and subsequently advancing said knife head in the other direction to remove any stubs which might remain.

10. A method of producing a log from standing timber which comprises swiftly shearing by impact the branches from the standing tree, shearing the base of said tree while continuing to hold the tree at a position above said base, moving without releasing the resulting log into stacked position, and then releasing said log onto a stack.

11. A method of harvesting trees comprising the steps of disposing a shearing mechanism at the base of a standing tree, disposing a combined delimbing and top shearing mechanism in encircling relation to the trunk of said tree below the branches thereof, advancing said combined delimbing and top shear mechanism upwardly at a rapid rate to a desired elevation thereby to remove all the branches below said desired elevation by impact shearing, shearing the top from said tree, and shearing the tree off at its base.

12. The process of harvesting timber comprising the steps of disposing a bottom shearing mechanism around the base of a standing tree, disposing a combined delimbing and top shearing mechanism in encircling relation to the trunk of said tree below the branches thereof, driving said combined delimbing and top shearing mechanism upwardly at a rapid rate to a predetermined elevation to remove all the branches below said elevation by impact shear, shearing the top off said tree, actuating said bottom shearing mechanism to sever said tree from its stump, and lowering said tree to the ground.

13. A process of harvesting timber comprising the steps of disposing a bottom shearing mechanism around the base of a standing tree, disposing a combined unit consisting of trunk supporting and delimbing means and a top shearing mechanism around the trunk of said tree below the branches thereof, forcibly driving said combined unit upwardly at a rapid rate to a desired elevation whereby all the branches of said tree below said elevation are removed by impact shearing, actuating the top shearing mechanism of said combined unit to remove the top of said tree, actuating said bottom shearing mechanism to sever said tree from its trunk, lowering said tree toward the horizontal, and releasing said trunk supporting means to drop said tree onto a stack.

14. A process of harvesting timber as recited in claim 13 comprising the additional step of dropping said combined unit part way down the tree prior to said lowering step.

15. A process of harvesting timber comprising the steps of disposing a bottom shearing mechanism around the base of a standing tree, disposing a combined unit consisting of trunk supporting and delimbing means and a top shearing mechanism around the trunk of said tree below the branches thereof, forcibly driving said combined unit upwardly at a rapid rate to a desired elevation whereby all the branches of said tree below said elevation are removed by impact shearing, actuating the top shearing mechanism of said combined unit to remove the top of said tree, dropping said combined unit downwardly at a rapid rate to shear off any stubs of the branches which may remain after the first delimbing operation, raising said combined unit to an intermediate position, actuating said bottom shearing mechanism to sever said tree from its trunk, lowering said tree toward the horizontal, and releasing said trunk supporting means to drop said tree onto a stack.

References Cited

UNITED STATES PATENTS

| 2,707,008 | 4/1955 | Bannister | 144—309 |
| 2,948,311 | 8/1960 | McCollum | 144—3 X |
| 3,140,736 | 7/1964 | Propot | 144—3 |
| 3,269,436 | 8/1966 | Moore | 144—34 |

WILLIAM W. DYER, Jr., *Primary Examiner.*

W. D. BRAY, *Assistant Examiner.*

UNITED STATES PATENT OFFICE

CERTIFICATE OF CORRECTION

Patent No. 3,353,575                      November 21, 1967

Robert W. Larson et al.

It is hereby certified that error appears in the above numbered patent requiring correction and that the said Letters Patent should read as corrected below.

In the heading to the printed specification, lines 3 to 6, for "Robert W. Larson, Rte. 2, Lake Park Road, Ashland, Wis. 54806; Ole E. Olson, Caramat, Ontario, Canada; and Wilfrid D. Harkness, Steedman Drive, and William E. Mair, Manitoba St., both of Marathon, Ontario, Canada" read -- Robert W. Larson, Ashland, Wis., Ole E. Olson, Caramat, Ontario, Canada, and Wilfrid D. Harkness and William E. Mair, Marathon, Ontario, Canada; said Larson assignor to Beloit Corporation, Beloit, Wis., a corporation of Wisconsin and said Olson, Harkness and Mair assignors to Marathon Corporation of Canada Limited, Marathon, Ontario, Canada, a corporation of Canada --.

Signed and sealed this 22nd day of October 1968.

(SEAL)

Attest:

Edward M. Fletcher, Jr.

Attesting Officer

EDWARD J. BRENNER

Commissioner of Patents